United States Patent
Samper et al.

(10) Patent No.: US 10,076,751 B2
(45) Date of Patent: Sep. 18, 2018

(54) SYSTEMS AND METHODS FOR REAGENT STORAGE

(71) Applicant: General Electric Company, Schenectady, NY (US)

(72) Inventors: Victor Donald Samper, Kirchseeon (DE); Christian Friedrich Peter Rensch, Munich (DE); Christoph Boeld, Munich (DE); Ruben Julian Salvamoser, Munich (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 419 days.

(21) Appl. No.: 14/144,047

(22) Filed: Dec. 30, 2013

(65) Prior Publication Data
US 2015/0182963 A1 Jul. 2, 2015

(51) Int. Cl.
*B01L 3/00* (2006.01)
*B01J 19/00* (2006.01)
*F16K 99/00* (2006.01)

(52) U.S. Cl.
CPC ..... *B01L 3/502715* (2013.01); *B01J 19/0093* (2013.01); *B01L 3/523* (2013.01); *F16K 99/003* (2013.01); *F16K 99/0015* (2013.01); *B01J 2219/00783* (2013.01); *B01J 2219/00873* (2013.01); *B01J 2219/00889* (2013.01); *B01J 2219/00894* (2013.01); *B01J 2219/00961* (2013.01); *B01J 2219/00963* (2013.01); *B01J 2219/00966* (2013.01); *B01J 2219/00986* (2013.01); *B01L 2200/028* (2013.01); *B01L 2200/04* (2013.01); *B01L 2200/12* (2013.01); *B01L 2200/16* (2013.01);
(Continued)

(58) Field of Classification Search
CPC .......... B01L 2300/0816; B01L 3/5027; B01L 2200/027; B01L 9/527; G01N 2021/058; Y10T 436/2575; Y10T 117/10; B01J 2219/0086
See application file for complete search history.

(56) References Cited

U.S. PATENT DOCUMENTS 3,568,735 A 3/1971 Lancaster
4,120,205 A 10/1978 Ripphahn et al.
(Continued)

FOREIGN PATENT DOCUMENTS

CN 101291729 A 10/2008
DE 19949912 5/2001
DE 102006006706 8/2007

OTHER PUBLICATIONS

U.S. Appl. No. 13/731,347, filed Dec. 31, 2012, Rensch et al.
(Continued)

*Primary Examiner* — Dennis White
*Assistant Examiner* — Bryan Kilpatrick
(74) *Attorney, Agent, or Firm* — GE Global Patent Operation; Pabitra Chakrabarti (57) ABSTRACT

A microfluidic device for storing a reagent includes a single unit includes a first portion having a reagent storage chamber configured to hold a reagent. The device also includes a second portion having a reaction chamber configured to support the reagent during a reaction process to form a product. The device also includes a valve configured to isolate the reagent storage compartment from the reaction chamber when the valve is in a closed state.

16 Claims, 8 Drawing Sheets

(52) U.S. Cl.
CPC ... *B01L 2300/0887* (2013.01); *B01L 2300/16* (2013.01); *B01L 2400/0638* (2013.01); *B01L 2400/0683* (2013.01); *F16K 2099/0084* (2013.01); *Y10T 156/10* (2015.01)

(56) References Cited

U.S. PATENT DOCUMENTS

| | | | |
|---|---|---|---|
| 4,388,411 | A | 6/1983 | Lovelock |
| 4,875,605 | A | 10/1989 | Weston |
| 4,925,444 | A | 5/1990 | Orkin et al. |
| 5,039,863 | A | 8/1991 | Matsuno et al. |
| 5,632,876 | A | 5/1997 | Zanzucchi et al. |
| 5,756,050 | A | 5/1998 | Ershow et al. |
| 5,776,103 | A | 7/1998 | Kriesel et al. |
| 5,786,679 | A | 7/1998 | Nishino et al. |
| 5,872,010 | A | 2/1999 | Karger et al. |
| 5,957,167 | A | 9/1999 | Feygin |
| 5,961,492 | A | 10/1999 | Kriesel et al. |
| 5,988,435 | A | 11/1999 | Edwards et al. |
| 6,024,925 | A | 2/2000 | Little et al. |
| 6,068,751 | A | 5/2000 | Neukermans |
| 6,120,733 | A | 9/2000 | Goodman et al. |
| 6,149,866 | A | 11/2000 | Luotola et al. |
| 6,173,073 | B1 | 1/2001 | Wang |
| 6,318,970 | B1 | 11/2001 | Backhouse |
| 6,395,232 | B1 | 5/2002 | McBride |
| 6,406,605 | B1 | 6/2002 | Moles |
| 6,457,361 | B1 | 10/2002 | Takauchi et al. |
| 6,499,515 | B2 | 12/2002 | Sander |
| 6,506,611 | B2 | 1/2003 | Bienert et al. |
| 6,524,456 | B1 | 2/2003 | Ramsey et al. |
| 6,524,790 | B1 | 2/2003 | Kopf-Sill et al. |
| 6,623,455 | B2 | 9/2003 | Small et al. |
| 6,631,648 | B2 | 10/2003 | Lal et al. |
| 6,706,538 | B1 | 3/2004 | Karg et al. |
| 6,774,616 | B2 | 8/2004 | Huhn et al. |
| 6,794,981 | B2 | 9/2004 | Padmanabhan et al. |
| 6,805,841 | B2 | 10/2004 | Shvets et al. |
| 7,040,144 | B2 | 5/2006 | Spaid et al. |
| 7,067,086 | B2 | 6/2006 | Huhn et al. |
| 7,122,153 | B2 | 10/2006 | Ho |
| 7,213,473 | B2 | 5/2007 | Mosier et al. |
| 7,258,253 | B2 | 8/2007 | Nicol et al. |
| 7,377,183 | B2 | 5/2008 | Su et al. |
| 7,435,381 | B2 | 10/2008 | Pugia et al. |
| 7,459,127 | B2 | 12/2008 | Pugia et al. |
| 7,459,128 | B2 | 12/2008 | Karg et al. |
| 7,628,082 | B2 | 12/2009 | Sparks et al. |
| 7,741,121 | B2 | 6/2010 | Elizarov et al. |
| 7,790,118 | B2 | 9/2010 | Maltezos et al. |
| 7,972,561 | B2 | 7/2011 | Viovy et al. |
| 7,985,198 | B2 | 7/2011 | von Blumenthal et al. |
| 8,210,209 | B2 | 7/2012 | Gilbert et al. |
| 8,268,262 | B2 | 9/2012 | Andersson et al. |
| 2004/0238052 | A1* | 12/2004 | Karp ............... B01F 5/0471 137/822 |
| 2004/0241042 | A1* | 12/2004 | Pugia et al. ............ 422/58 |
| 2005/0265908 | A1 | 12/2005 | Najafi |
| 2005/0271563 | A1 | 12/2005 | Yang et al. |
| 2006/0222569 | A1 | 10/2006 | Barten et al. |
| 2006/0235335 | A1 | 10/2006 | Elsenhans et al. |
| 2007/0200081 | A1 | 8/2007 | Elizarov et al. |
| 2008/0145286 | A1* | 6/2008 | Maltezos ........ B01L 3/502707 422/224 |
| 2009/0008395 | A1 | 1/2009 | Sattler et al. |
| 2009/0129988 | A1 | 5/2009 | Talmer et al. |
| 2009/0181411 | A1* | 7/2009 | Battrell et al. ............... 435/7.92 |
| 2010/0158756 | A1 | 6/2010 | Taylor et al. |
| 2010/0304986 | A1 | 12/2010 | Chen et al. |
| 2011/0104024 | A1 | 5/2011 | Gransee et al. |
| 2011/0150714 | A1 | 6/2011 | Elizarov et al. |
| 2012/0025521 | A1 | 2/2012 | Baller et al. |
| 2012/0027648 | A1 | 2/2012 | Samper et al. |
| 2012/0101268 | A1 | 4/2012 | Elizarov et al. |
| 2012/0183956 | A1 | 7/2012 | Ross et al. |
| 2012/0184722 | A1* | 7/2012 | Samper et al. ................. 534/10 |
| 2012/0264932 | A1* | 10/2012 | Van Dam et al. ............ 536/122 |
| 2012/0267561 | A1 | 10/2012 | Samper et al. |
| 2012/0276641 | A1 | 11/2012 | Dimov et al. |
| 2013/0000758 | A1* | 1/2013 | Hoen ................ F04B 43/046 137/565.01 |
| 2013/0000759 | A1* | 1/2013 | Killeen ................ F04B 49/03 137/565.16 |
| 2013/0112650 | A1 | 5/2013 | Karam et al. |
| 2013/0183209 | A1 | 7/2013 | Richter et al. |
| 2013/1070931 | | 7/2013 | Samper et al. |
| 2013/0252796 | A1 | 9/2013 | Von Stetten et al. |
| 2013/0316335 | A1 | 11/2013 | Ross et al. |

OTHER PUBLICATIONS

U.S. Appl. No. 14/144,066, filed Dec. 30, 2013, Samper et al.
Garcia-Cordero et al., "Low-Cost Microfluidic Single-Use Valves and On-Board Reagent Storage using Laser-Printer Technology", IEEE 22nd International Conference on Micro Electro Mechanical Systems, pp. 439-442, Jan. 2009.
Zheng et al., "A Screw-Actuated Pneumatic Valve for Portable, Disposable Microfluidics", Lab on a Chip, pp. 469-472, vol. 9, Issue 4, 2009.
Chen et al., "An Integrated, Self-Contained Microfluidic Cassette for Isolation, Amplification, and Detection of Nucleic Acids", Biomed Microdevices, pp. 705-719, vol. 12, Issue 4, Aug. 2010.
Siegrist et al., "Microfluidics for IVD analysis: Triumphs and hurdles of centrifugal platforms Part 3: Challenges and solutions", Microfluidics for IVDs, pp. 22-26, 2010.
Tseng, W.Y., et al.; "PDMS Evaporation Chip to Concentrate [18F]Fluoride for Synthesis of Pet Tracers in Microfluidics", 14th International Conference on Miniaturized Systmes for Chemistry and Life Sciences, Oct. 2010, Groningen, The Netherlands.
Abi-Samra et al., "Infrared Controlled Waxes for Liquid Handling and Storage on a CD-Microfluidic Platform", Lab on a Chip, pp. 723-726, vol. 11, Issue 4, Feb. 21, 2011.
Rensch, Christian, et al.; "Microfluidics: A Groundbreaking Technology for PET Tracer Production", Molecules Jul. 2013, 18, 7930-7956.
PCT/US2010/062453 ISRWO dated Apr. 26, 2011.
Search Report and Written Opinion from corresponding PCT Application No. PCT/EP2014/078996 dated Mar. 17, 2015.
Hoffmann, J., et al., "Pre-storage of liquid reagents in glass ampoules for DNA extraction on a fully integrated lab-on-a-chip cartridge," The Royal Society of Chemistry, vol. 10, pp. 1480-1484 (Mar. 17, 2010).
"Vial Crimper and Decapper Hand Tools and Equipment," Kebby Industries Inc, Retreived from the internet URL: http://www.thinxxs.com/main/produkte/microfluidixxs/blister-on-a-chip.html, on Jun. 9, 2017, pp. 1-2.
Office Action and Search issued in connection with corresponding CN Application No. 201480076549.7 dated Mar. 28, 2017.

* cited by examiner

SYSTEMS AND METHODS FOR REAGENT STORAGE

BACKGROUND

Various medical procedures utilize reagents or mixtures of reagents for treatment or diagnosis of patient conditions. For example, certain imaging modalities use radiopharmaceuticals to generate medical images of a patient. Some such imaging modalities include positron emission tomography (PET) or single photon emission computed tomography (SPECT). PET and SPECT are used in conjunction with a radiopharmaceutical or a radioactive tracer that is administered to (e.g., injected into) the patient, which results in the emission of gamma rays from locations within the patient's body. The emitted gamma rays are then detected by the PET or SPECT detector and an image is created based on characteristics of the detected gamma ray emissions. Additionally, certain radiopharmaceuticals may be used to treat various patient conditions. Examples of radiopharmaceuticals include FDG (2-[$^{18}$F]-fluoro-2-deoxyglucose), other $^{18}$F based fluorinated tracers, $^{13}$N ammonia, $^{11}$C based tracers, $^{15}$O gas, and $^{15}$O water, and others.

Radiopharmaceuticals have short half lives typically ranging from minutes to hours, and thus, the injection and imaging generally takes place within a short time after production of the radiopharmaceutical. Accordingly, to prevent undue decay of such radiopharmaceuticals prior to use, the radiopharmaceuticals are often synthesized onsite at or near medical facilities where the PET or SPECT imaging system is located. However, the systems used to generate such radiopharmaceuticals often are only capable of generating large batches, which is not only time-consuming and expensive, but often generates excess radiopharmaceutical product that cannot be used by the medical facility and is wasted. Accordingly, it is desirable to provide a system that enables long-term storage of radiopharmaceutical reagents and a synthesis technique that yields small batches of radiopharmaceuticals.

BRIEF DESCRIPTION

In one embodiment, a microfluidic device for storing a reagent includes a single unit having a first portion having a reagent storage chamber configured to hold a reagent. The device also includes a second portion having a reaction chamber configured to support the reagent during a reaction process to form a product. The device also includes a valve configured to isolate the reagent storage compartment from the reaction chamber when the valve is in a closed state.

In one embodiment, a system for storing a reagent includes a microfluidic device having one or more layers forming a substrate and a reagent storage compartment configured to store a reagent disposed within the substrate. The device also includes a reaction chamber fluidly coupled to the reagent storage compartment via a flow path extending between the reagent storage chamber and the reaction compartment, and the reaction chamber is configured to hold the reagent during a reaction process. The device further includes a valve disposed across the flow path, the valve being configured to seal the flow path when the valve is in a closed state. The system also includes an interface system that is configured to receive the device and to manipulate the device to initiate movement of the reagent from the reagent storage compartment toward the reaction chamber.

In one embodiment, a method of manufacturing a microfluidic device for storing a reagent is provided. The method includes generating a substrate having one or more layers and creating reagent storage compartment within the substrate, wherein the reagent storage compartment includes an inlet and a flow path configured to transport a reagent from the reagent storage compartment. The method also includes inserting a reagent into the reagent storage compartment via the inlet, applying a valve having a valve body and a membrane along the flow path, and positioning a sealing mechanism over the membrane and through the valve body to seal the flow path and to contain the reagent within the reagent storage compartment.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure relates to a microfluidic cassette configured to store various reagents, such as reagents for the synthesis of radiopharmaceuticals. The microfluidic cassette may be used in conjunction with an interface system (e.g., a synthesizer) that is configured to facilitate synthesis of radioactive compounds from the reagents stored within the microfluidic cassette. While the techniques of the present application are described in the context of a PET or SPECT system and synthesis of a radiopharmaceutical suitable for PET or SPECT imaging, it should be understood that the systems and methods disclosed herein may be utilized and/or adapted for storage of any of a variety of reagents and/or for use in any of a variety of diagnostic or therapeutic contexts.

Radiopharmaceutical production is relatively complex and involves specialized equipment and skilled personnel. The use of microfluidic cassettes for radiopharmaceutical production facilitates smaller-scale production of compounds at the point of use, which in turn may enable production of such compounds in smaller facilities and with smaller synthesis machines. Provided herein are embodiments of microfluidic cassettes that may enable long-term storage of reagents for the synthesis of radiopharmaceuticals and facilitate more efficient production of radiopharmaceuticals in a medical setting. Also provided herein are embodiments of methods for manufacturing the microfluidic cassettes and for generating radiopharmaceuticals using the microfluidic cassettes in conjunction with an interface system.

Figure 1:
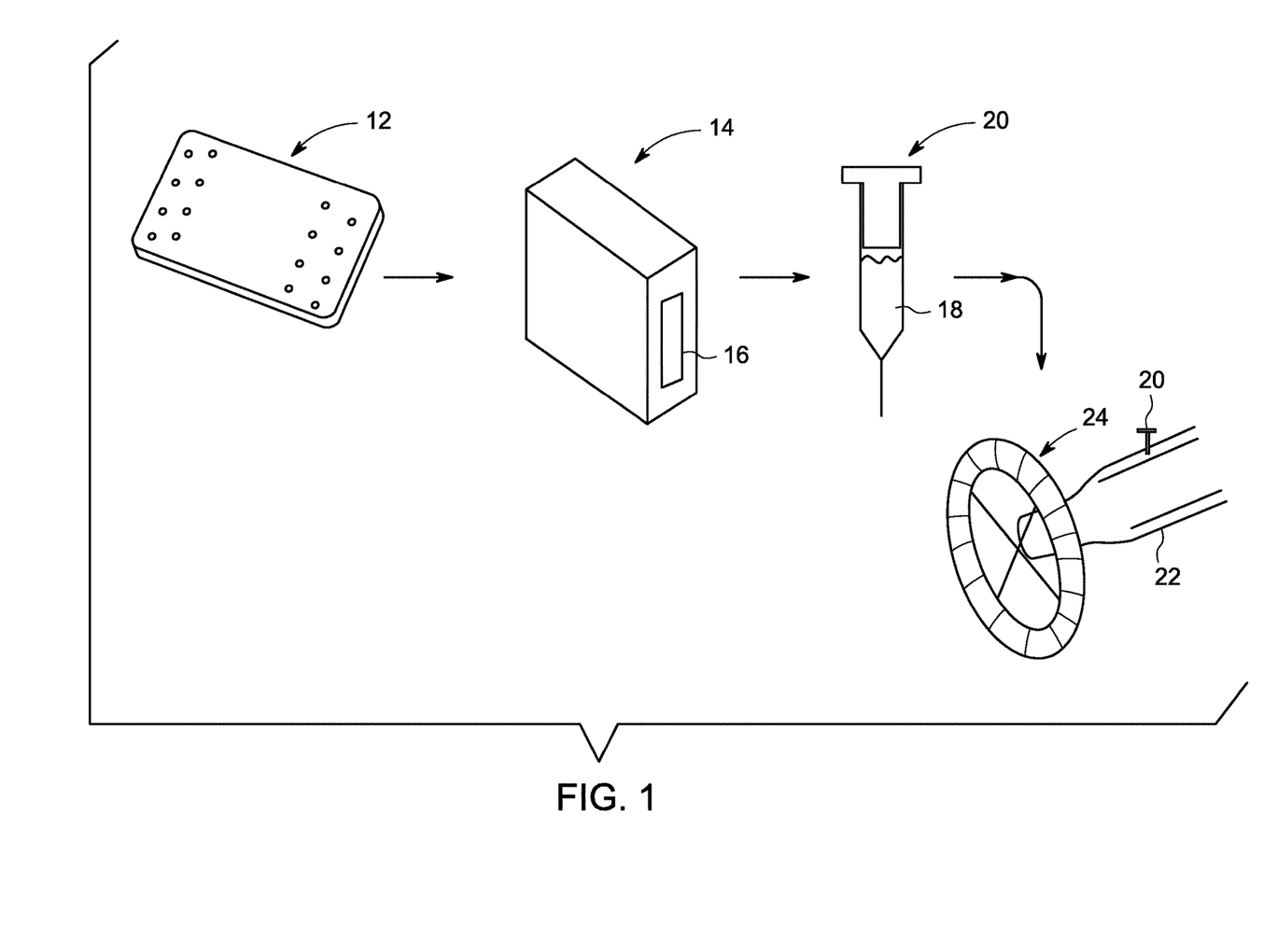
FIG. 1 is a schematic of a technique for using a microfluidic cassette and an interface system to generate a radiopharmaceutical for patient imaging procedures, in accordance with an embodiment.

With the foregoing in mind, FIG. 1 illustrates a radiocompound synthesis system 10 for generating a radiopharmaceutical (e.g., a radiocompound or a radioactive compound) suitable for use in various medical treatments or imaging techniques, such as PET or SPECT imaging techniques. The system 10 includes a microfluidic cassette 12 (e.g., a cassette, a microfluidic chip, a microfluidic storage device, or a microfluidic device) and an interface system 14 (e.g., a radiopharmaceutical synthesizer, a radiocompound synthesizer, or a radioactive compound synthesizer). The microfluidic cassette 12 may be configured to store one or more reagents, which may include radioactive and/or non-radioactive reagents (e.g., reagents in a nonradioactive state). The microfluidic cassette 12 may be configured to store dry solvents (e.g., purified organic solvents), aqueous substances (acidic, neutral, and alkaline), and lyophilized substances. In accordance with the present embodiments, the microfluidic cassette 12 may include features that enable the storage of reagents configured to produce the radiopharmaceutical 18 as well as one or more solvents used in the radiopharmaceutical production process. These features, as well as the manufacturing techniques used to produce these features, are discussed in detail below.

As shown, the interface system 14 may have any form suitable form and/or function and may generally be any component that enables desired functionality of the microfluidic cassette 12. For example, the interface system may be any component external to the microfluidic cassette 12 that is configured to facilitate synthesis or generation of the radiopharmaceutical 18 with the microfluidic cassette 12. Accordingly, the various embodiments of the interface system 14 described herein are not intended to be limiting. As shown in the illustrated embodiment, the interface system 14 may include a slot 16 (e.g., receptacle or cavity) that is shaped to receive and/or to accommodate (e.g., hold) the microfluidic cassette 12. Thus, during a synthesis process, the microfluidic cassette 12 may be placed within (e.g., inserted or loaded into) the slot 16. Regardless of its form, the interface system 14 is generally configured to manipulate the microfluidic cassette 12 and/or to initiate a reaction process to generate a radiopharmaceutical 18 using the one or more reagents stored within the microfluidic cassette 12. The microfluidic cassette 12 and/or the interface system 14 may also be configured to coordinate to provide reaction conditions (e.g., a temperature, a pressure, etc.) for synthesis of the radiopharmaceutical 18. As described in more detail below, the interface system 14 may be a processor-based machine that is configured to perform and/or to initiate the synthesis steps without user intervention, or the interface system 14 may be configured to receive a user input and to execute instructions in response to the user input. Once synthesized, the radiopharmaceutical 18 may be then be used in an appropriate therapeutic or diagnostic technique. For example, as shown the radiopharmaceutical 18 may be collected and/or transferred to a device, such as a syringe 20, and may be administered to (e.g., injected into) a patient 22 for PET imaging using a PET system 24.

Figure 2:
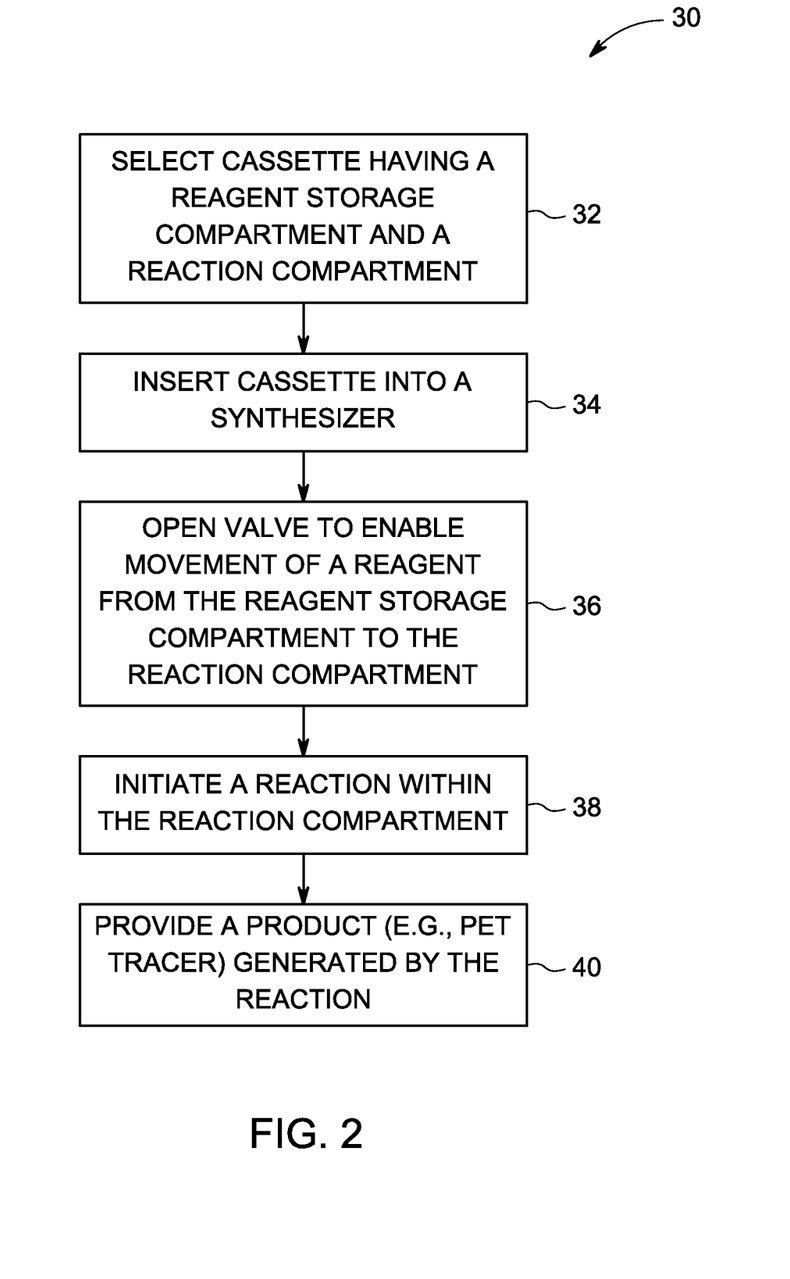
FIG. 2 is a flow diagram of a method of generating a radiopharmaceutical using a microfluidic cassette and an interface system, in accordance with an embodiment.

FIG. 2 is a flow diagram of an embodiment of a method 30 for synthesizing the radiopharmaceutical 18 using the microfluidic cassette 12 and the interface system 14. The method 30 includes various steps represented by blocks. It should be noted that any of the methods provided herein, may be performed as an automated procedure by a system, such as system 10. Further, certain steps of the method 30 may be implemented by a process-based machine including a memory storing instructions for facilitating all or part of a particular step of the method 30. The memory may be any suitable volatile memory device and/or a non-volatile mass-storage device, and in some embodiments, the processor-based machine may be the interface system 14. The processor based machine may be configured to perform certain steps without user intervention or may be configured to receive a user input and execute instructions in response to the user input. Accordingly, such machines may include suitable user interface components, including a display and/or user input controls. The instructions may include providing an input to hardware components of the system 10, which may function to mechanically or otherwise physically interact with one or more components of the system 10. Additionally, although the flow diagram illustrates the steps in a certain sequence, it should be understood that the steps may be performed in any suitable order and certain steps may be carried out simultaneously, where appropriate. Further, certain steps or portions of the method may be performed by separate devices. For example, a first portion of the method may be performed by the interface system 14, while a second portion of the method may be performed by a user or by a separate processing device. Additionally, although the method 30 is described with respect to one microfluidic chip 12, it should be understood that the interface system 14 may be configured to receive and to process more than one microfluidic chip 12 (e.g., 2, 3, 4, 5, 6, 7, 8, 9, 10, or more) simultaneously or approximately simultaneously (e.g., during overlapping time periods). Through such techniques, one or more batches of the radiopharmaceutical 18, or different product as desired, may be generated.

As shown, the method 30 begins by selecting the microfluidic cassette 12 having a reagent storage compartment and a reaction chamber at step 32. As described in more detail below, the microfluidic cassette 12 may include any suitable number of separate (e.g., isolated) reagent storage compartments (e.g., 1, 2, 3, 4, 5, 6, 7, 8, 9, 10, or more) configured to hold and/or to store one or more reagents. Additionally, the microfluidic cassette 12 may include any suitable number of reaction chambers (e.g., 1, 2, 3, 4, 5, 6, 7, 8, 9, 10, or more) configured to receive the one or more reagents from the reagent storage compartments via one or more flow paths extending between the reagent storage compartment and the reaction chamber. The reaction chamber may also be configured to hold and/or to support the one or more reagents as they are mixed or otherwise processed (e.g., heated, cooled, etc.) during a reaction process (e.g., a mixing process, a chemical reaction, etc.). The microfluidic cassette 12 may be configured to store the reagents for long periods of time (e.g., hours, days, months, one year, or longer) without contamination or degradation of the reagents.

In some embodiments, step 32 may be carried out by an operator (e.g., a user) that selects the microfluidic cassette 12 based on the type and/or the amount (e.g., volume) of radiopharmaceutical 18 that is desired. In certain embodiments, the interface system 14 or other automated device (e.g., a microfluidic cassette handling device) may be configured to select and/or to retrieve the microfluidic cassette 12 (e.g., from a magazine or other storage device having multiple microfluidic cassettes 12) via an automated handling process. Additionally, in some embodiments, the interface system 14 may be configured to receive a user input and to select and/or to retrieve the appropriate microfluidic cassette 12 based at least in part on the user input. In such cases, multiple different microfluidic cassettes 12 may be available (e.g., stored in a magazine or other storage device), the microfluidic cassettes 12 being configured to synthesize different types and/or amounts of radiopharmaceuticals 18, for example. Various techniques for storing, selecting, and/or using a microfluidic cassette using a microfluidic handling system are disclosed in U.S. Patent Application Publication No. 2013/0170931, which is incorporated by reference herein in its entirety for all purposes.

At step 34, the microfluidic cassette 12 may be coupled to (e.g., inserted, placed, disposed, loaded) the interface system 14 or may otherwise interact with the interface system 14. As with step 32, the microfluidic cassette 12 may be coupled to the interface system 14 manually (e.g., by an operator) or via an automated process by the interface system 14 or other suitable device. In some embodiments, the microfluidic cassette 12 may be coupled to the corresponding slot 16 of the interface system. Once coupled to the interface system 14, the microfluidic cassette 12 is processed at step 36 according to the particular parameters associated with the microfluidic cassette 14 and/or according to the particular settings of the interface system 14. For example, in some embodiments, the interface system 14 may manipulate the microfluidic cassette 12 to open one or more control devices (e.g., valves) to enable movement of one or more substances (e.g., reagents or solvents) from the reagent storage compartments to the reaction chamber. In some embodiments, the interface system 14 may manipulate the valves to facilitate transfer (e.g., movement or venting) of materials, such as gas, out of certain portions (e.g., the reagent storage compartment, reaction chamber, or other internal portions) of the microfluidic cassette 12. In certain embodiments, the interface system 14 may be configured to systematically and automatically control the valves of the microfluidic cassette 12 to adjust the movement (e.g., flow) of the reagents or solvents within the microfluidic cassette 12. In certain embodiments, the interface system 14 may control the valves according to programmed settings, thus opening the valves at predetermined times and in a predetermined sequence. In some configurations, the valves of the microfluidic cassette 12 may be aligned with various actuators within the interface system 14 to facilitate control of the valves, as described in more detail below.

At step 38, the interface system 14 may initiate, direct, and/or control a reaction within the reaction compartment of the microfluidic cassette 12. In some embodiments, the reaction may be initiated by opening the valves to enable movement of the reagent toward the reaction chamber. In certain embodiments, initiating the reaction may include additional or alternative techniques. For example, the interface system 14 may include a heat source, a cooling source, a mechanical agitation (e.g., vibration) source, or the like. In some embodiments, the interface system 14 may monitor the reaction (e.g., temperature, pH, or other properties in the reaction chamber) and/or may adaptively adjust reaction conditions (e.g., temperature, pressure, agitation, etc.). Through such techniques, the system 10 may synthesize a product via the reaction, such as the radiopharmaceutical 18 suitable for PET imaging, as provided in step 40. Because the microfluidic cassette 12 may be used to generate a particular compound (e.g., the mircofluidic cassette 12 is specific to a particular compound), successive runs on the interface system 14 may yield different compounds using different types of microfluidic cassettes 12.

As discussed in more detail below, in certain embodiments, the microfluidic cassette 12 may be a self-contained device that stores all reagents for generating the radiopharmaceutical 18 and/or the radiopharmaceutical 18 may be generated on the microfluidic cassette 12 without exchanging any reagents or solvents with the interface system 14 and/or an environment external to the microfluidic cassette 12. The reagents or solvents may be stored and isolated from the environment external to the microfluidic cassette 12 for a period of time (e.g. an extended period of time) prior to initiation of the reaction process, as discussed in more detail below. Thus, the reaction process may be carried out and/or the radiopharmaceutical 18 may be generated within the microfluidic cassette 12 without introduction of additional materials or reagents (e.g., without additional materials or reagents other than those stored within the reagent storage compartment or other storage components) to the microfluidic cassette 12 prior to initiation of the reaction process. In certain embodiments, after the radiopharmaceutical 18 is generated, the radiopharmaceutical 18 may be transferred (e.g., manually by an operator or via an automated handling system) from the microfluidic cassette 12 to another device, such as the syringe 20 for administration to the patient 22. In some embodiments, waste from the reaction process may remain in the microfluidic cassette 12, which may be ejected into a separate waste container and discarded (e.g., a disposable microfluidic cassette). In some embodiments, the microfluidic cassette 12 may be transferred in whole or in part to another device for cleaning and reuse, for example. Thus, in some embodiments, the microfluidic cassette 12 may be recycled and prepared for reuse (e.g., by cleaning and reloading reagents). As noted above, multiple microfluidic chips 12 may be processed simultaneously by the interface system 14 via the method 30, or in certain embodiments, multiple microfluidic chips 12 may be selected and processed sequentially according to the method 30, based on a programmed routine or user input, for example.

Figure 3:
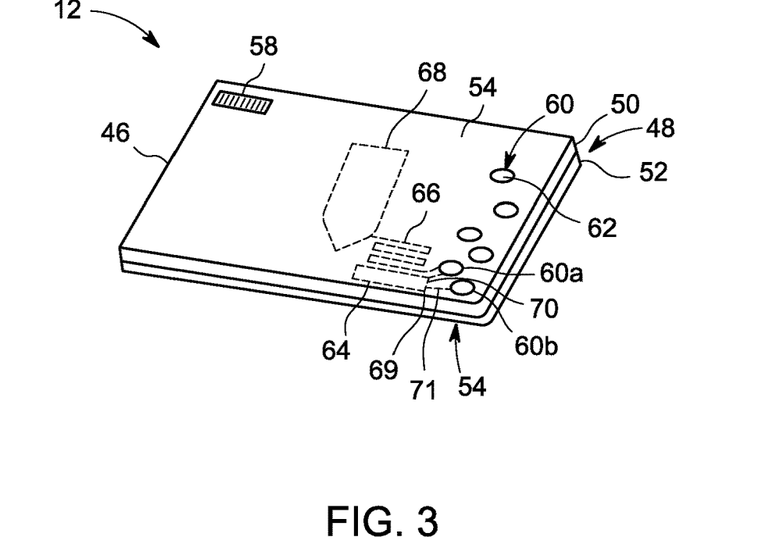
FIG. 3 is a top perspective view of a microfluidic cassette having a reagent storage compartment, a reaction chamber, flow paths, and valves, in accordance with an embodiment.

Turning to FIG. 3, a schematic top perspective view of one embodiment of the microfluidic cassette 12 is illustrated. As shown, the microfluidic cassette 12 may include a substrate 46 having multiple layers 48 placed adjacent to each other (e.g., in direct contact or indirect contact via one or more layers) in a stacked configuration. The microfluidic cassette 12 may include any suitable number of layers 48 (e.g., 1, 2, 3, 4, 5, 6, 7, 8, 9, 10, or more layers) that may be coupled together, such as removeably coupled or fixedly attached or bonded together, as discussed in more detail below. As shown, the microfluidic cassette 12 includes a first (e.g., top) layer 50 and a second (e.g., bottom) layer 52, which may be in direct or indirect contact and/or may be coupled together via bonding or other attachment. In some embodiments, the layers 48 may include any suitable material, including any suitable polymer material, such as cyclic olefin copolymer (COC) or thermoplastic polymers. In certain embodiments, the microfluidic cassette 12 may additionally or alternatively include silicon or glass structures or layers 48. Each layer 48 may include all or a portion of various features or vessels (e.g., reagent storage compartments, reaction chambers, flow paths or meanders, valves, as discussed below) and/or the multiple layers 48 may form certain features or vessels of the microfluidic chip 12 when the layers 48 are coupled together.

Additionally, the layers 48 may be configured such that the various vessels are appropriately connected (e.g., interconnected or in fluid communication) to enable the reagents (e.g., fluid or dry materials) to travel between the vessels of the layers 48 when the layers 48 are coupled together. For example, the vessels may be connected via aligning the layers 48 and bonding the layers 48 together, as discussed below. As shown, the layers 48 may be stacked between and may form a first (e.g., top) surface 54 and a second (e.g., bottom) surface 56 generally opposing the first surface 54 of the microfluidic cassette 12. Certain vessels for storing and/or transporting the reagents (e.g., reagent storage compartments, flow paths, and/or reaction chambers) may be fully contained (e.g., housed) within the layers 48 such that no portion of the vessels protrude or extends past the surfaces 54, 56. Additionally, in some embodiments, the layers 48 and/or the surfaces 54, 56 may be rigid (e.g., non-flexible or non-bendable) and may be of greater thickness and stiffness than a film or coating. Additionally, the microfluidic cassette 12 may have any suitable shape or form, including a generally rectangular or circular horizontal cross-section.

In some embodiments, the microfluidic cassette 12 may include a feature 58, such as a surface feature (e.g., notch, cut-out, protrusion, etc.), a color, a material property, and/or a geometry (e.g., a shape or size), configured to help a user or the interface system 14 identify the microfluidic cassette 12 or the type of microfluidic cassette 12. For example, all microfluidic cassettes 12 configured to store reagents for generating radiopharmaceuticals 18 for PET imaging may have a particular, recognizable feature or geometry, while microfluidic cassettes 12 for other applications may include different features. In some embodiments, the surface feature of the microfluidic cassette 12 may be configured to align with a corresponding feature within the slot 16 of the interface system to provide a secure fit or connection between the microfluidic cassette 12 and the interface system 14 and/or to provide a confirmation that the microfluidic cassette 12 is properly seated within the interface system 14 for processing, for example. In certain embodiments, the microfluidic cassette 12 may be tagged or labeled with identification information or processing or handling instructions for utilizing the cassette to streamline synthesis and processing by the interface system 14. For example, the feature 58 of the microfluidic cassette 12 may be a bar code, a magnetic strip, an optical tag, an RFID, a color, a physical shape, a text label, an electronic label, physical features, or any other unique identifying feature. The identification information may stored on the microfluidic cassette 12 and may be read by a recognition unit associated with the interface system 14, and the interface system 14 may be configured to take an action in response to reading the identification information.

As shown in FIG. 3, one or more valves 60 may be disposed within one or more layers 48 of the microfluidic cassette 12. The valves 60 may include a membrane 62 (e.g., a membrane valve) positioned adjacent to the top surface 54 of the microfluidic cassette 12. The valve 60 may be configured to seal the reagent within a reagent storage compartment 64 of the microfluidic cassette 12 for storage and/or to control the movement (e.g., flow, transfer, etc) of the reagent out of the reagent storage compartment 64 for the reaction process. In some embodiments, the microfluidic cassette 12 may also include a flow path 66 (e.g., meander) extending between the reagent storage compartment 64 and another feature or component of the microfluidic cassette 12, such as a reaction chamber 68, as shown in FIG. 3. For purposes of discussion, the embodiments described below generally discuss transfer of the reagent from the reagent storage compartment 64 to the reaction chamber 68 via the flow path 66, but it should be understood that the flow path 66 may extend between any suitable components, including any of the reagent storage compartment 64, the reaction chamber 68, a heat exchanger, a metering component for measuring a volume of the reagent, a sensing component, a solid phase extraction component, a filtration component, a separation component, a mixing component, for example. Thus, the flow path 66 may enable transfer or transport of the reagent between various components of the microfluidic cassette 12. Further, as discussed in more detail below, the valve 60 may be positioned along the flow path 66, and thus, may be configured to control movement of any material, such as the reagent, between any suitable components or features of the microfluidic cassette 12. The flow path 66 may be a meandering or generally tortuous channel so as to provide a large surface area for improved heat transfer, which may facilitate heating or cooling of the reagent as the reagent moves through the flow path 66, for example.

The reagent storage compartment 64 (e.g., each storage compartment 64) may include an inlet 69 and an outlet 70. In some embodiments, each inlet 69 may have a corresponding valve 60a (e.g., a first valve or an input valve), and each outlet may have a corresponding valve 60b (e.g., a second valve or an output valve). In certain embodiments, a reagent may be provided to the reagent storage compartment 64 directly via an input septum located adjacent to the reagent storage compartment 64, or indirectly via an inlet channel 71, during manufacturing, for example. In some such embodiments, the reagent may then be sealed within the reagent storage compartment 64 by sealing the inlet 69 by closing the first valve 60a, which may be positioned along the inlet channel 71. Upon actuation of the second valve 60b positioned along the flow path 66, the reagent may travel from the reagent storage compartment 64 toward any suitable component of the microfluidic cassette 12, such as the reaction chamber 68, via flow path 66.

In certain embodiments, more than one reagent may be provided to the reaction chamber 68, which supports the reagents during a reaction process to generate the radiopharmaceutical 18. The reaction chamber 68 may also prevent the ingress of unwanted (e.g., undesirable) materials (e.g., water or oxygen) into a reaction mixture of the reactants. For example, the reaction chamber 68 and associated valving may form a hermetic seal. As discussed above, any suitable number of valves 60, reagent storage compartments 64, flow paths 66, and/or reaction chambers 68 may be provided on the microfluidic cassette 12 to facilitate generation of the radiopharmaceutical 18. Additional vessels or channels may be provided for further manipulation of the reagent prior to processing and/or processing after formation of the radiopharmaceutical 18. For example, additional channels or flow paths 66, as well as valves 60, may be provided to facilitate transfer (e.g., movement or venting) of materials, such as gas, out of certain portions (e.g., the reagent storage compartment, reaction chamber, or other internal portions) of the microfluidic cassette 12. Additionally, such features may be included (e.g., housed or formed) within any of the layers 48 of the microfluidic cassette 12. It should also be understood that the reagents may be stored in any suitable portion of the microfluidic cassette 12, including within the reaction chamber 68, one or more of the flow paths 66, or inlet channels 71, for example.

Figure 4:
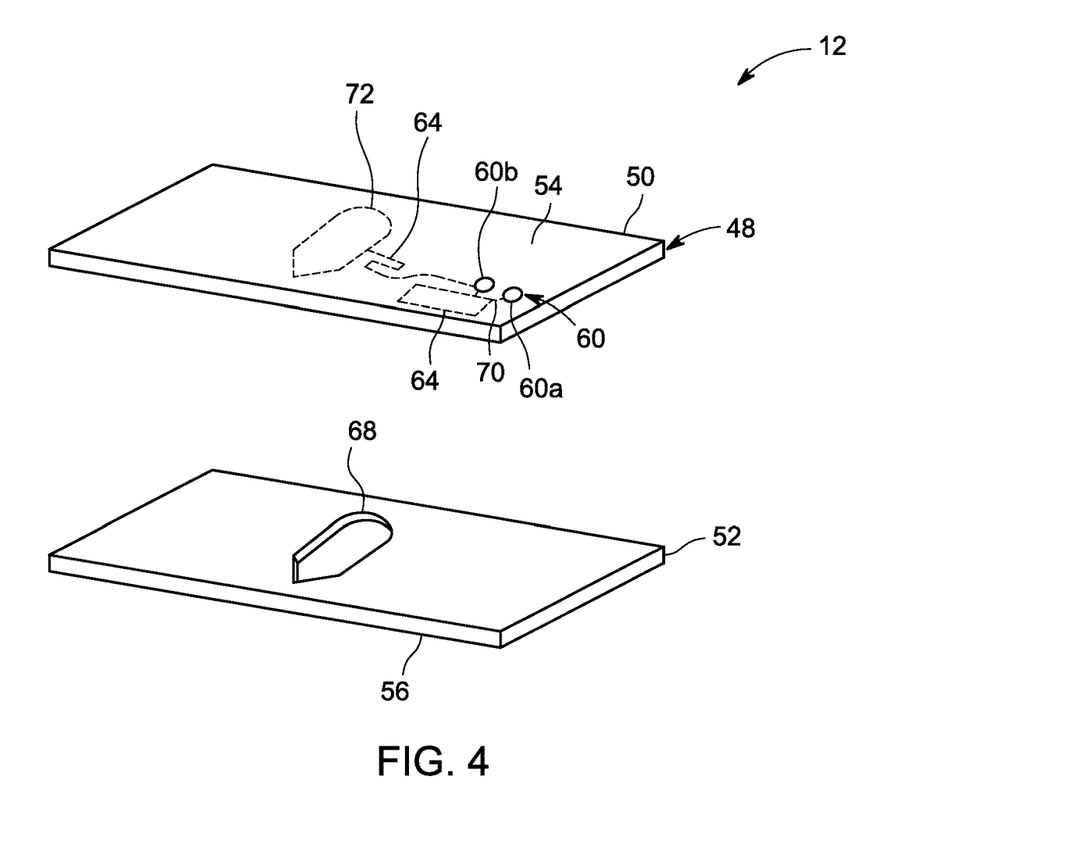
FIG. 4 is an exploded view of multiple layers of one embodiment of the microfluidic cassette of FIG. 3.

FIG. 4 is an exploded perspective view of one embodiment of the multiple layers 48 of the microfluidic cassette 12. As noted above, the microfluidic cassette 12 may include multiple layers 48 (e.g., between 2 and 50) having or forming various chambers, vessels, or similar features that may be utilized to generate the radiopharmaceutical 18. Additionally, the layers 48 may be configured such that the vessels are suitably connected to facilitate generation of the radiopharmaceutical 18, in accordance with the techniques disclosed herein. In the illustrated embodiment, the top layer 50 supports the valves 60 and may include the inlet channels 71, the reagent storage compartment 64, and/or the flow paths 66 extending to the reaction chamber 68. In some embodiments, the top layer 52 may include a cavity 72 that forms a top of the reaction chamber 68 when the top layer 52 and the bottom layer 54 are coupled together (e.g., removably or fixedly attached, bonded, mated with, etc.). As shown, the bottom layer 52 may include corresponding features (e.g., geometric features formed into the layer 52) that, together with the top layer 52, form vessels such as the reaction chamber 68. Thus, the reaction chamber 68 is formed when the top layer 52 and the bottom layer 54 are coupled together. Additionally, it should be understood that one of the layers 48 may house any of the various components of the microfluidic cassette 12. For example, the reagent storage compartment 64 may be fully housed (e.g., enclosed or isolated) within the top layer 52 or the bottom layer 54, while the reaction chamber 68 may be fully housed or formed within the top layer 52 or the bottom layer 54, wherein the layers 48 are in communication with each other via flow paths 66. Additionally, the layers 48 may be coupled together via any suitable technique, such as melting, bonding, or adhesives, for example.

The microfluidic cassette 12 may also include various chambers and/or vessels having one or more associated openings or valves 60 to facilitate separation of the radiopharmaceutical 18 from other reaction components, such as solvents. The materials used in the microfluidic cassette 12 may be chosen to be compatible with the reagents and solvents used. For example, any reagent-contacting or solvent-contacting surface of the layer 48 or chambers formed therein may be formed from or coated with a material that is not affected (e.g., does not degrade, dissolve, or interact with) the reagents or the solvents used in the reaction.

Figure 5:
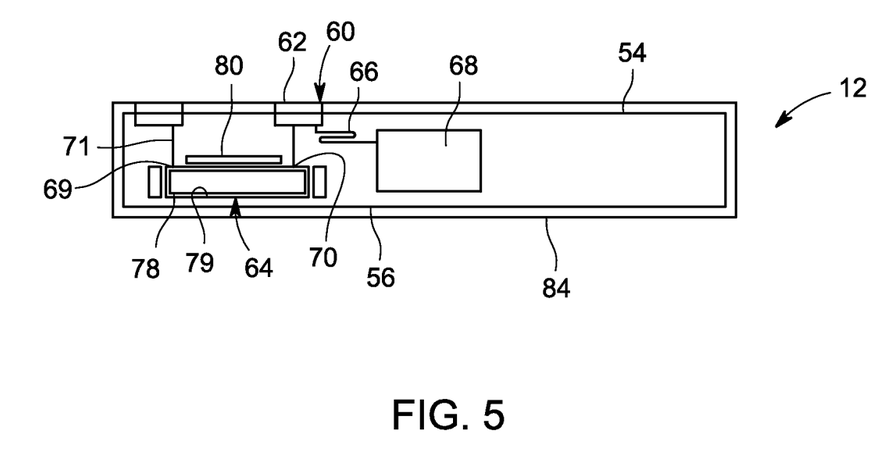
FIG. 5 is cross-sectional side view schematic of a microfluidic cassette having a reagent storage compartment and a reaction chamber.

FIG. 5 is a cross-sectional side view schematic of one embodiment of the microfluidic cassette 12 having the reagent storage compartment 64 and the reaction chamber 68. In the depicted embodiment, the microfluidic cassette is in a single-piece configuration, wherein the reagent storage compartment 64 and the reaction chamber 68 are housed within a single piece of continuous material or in multiple layers 48 fixedly attached or bonded together. In such embodiments, the reagent storage compartment 64 and the reaction chamber 68 may not be separable from each other and may be permanently fixed within the material forming the layer 48 or layers 48. Such a configuration may be durable and may desirably provide a single-piece microfluidic cassette 12 that is easy to use in medical settings, as opposed to other storage methods, such as blister packs or the like.

Additionally, as shown, the microfluidic cassette 12 may include various features to facilitate isolation of the reagent in the reagent storage compartment 64 and/or to reduce contamination or diffusion of the reagent during storage. For example, a coating 78 (e.g., a surface coating) may be disposed on various reagent-contacting surfaces of the microfluidic cassette 12. As shown, the coating 78 is disposed on at least a portion of an interior surface 79 of the reagent storage compartment 64 (e.g., the surface of the reagent storage compartment 64 that contacts the stored reagent or solvent). The coating 78 may be any suitable material that provides a barrier to reduce diffusion of substrate material into the reagent storage compartment 64 (e.g., into the reagent or solvent) and/or diffusion of the reagent or solvent from the reagent storage compartment 64. By way of non-limiting example, the coating 78 may be any suitable barrier material, such as a metal layer (e.g., an aluminum layer), a glass, or a ceramic, and the coating 78 may be bondable or non-bondable. The coating 78 may also provide an additional barrier between the interior of the reagent storage compartment and the external environment surrounding the microfluidic cassette 12. It should be understood that the coating 78, may additionally or alternatively be disposed on at least a portion of reagent-contacting surfaces of the flow paths 66 and/or the reaction chamber 66. In some embodiments, multiple different types of coatings 78 may be disposed on the reagent-contacting surfaces of the microfluidic cassette 12.

In certain embodiments, as shown, the reagent storage compartment 64 may be at least partially surrounded or encompassed by one or more isolation features 80 (e.g., isolation arms or suspension arms). In some embodiments, one or more isolation features 80 may additionally or alternatively partially surround other chambers or vessels (e.g., the reaction compartment 68). Furthermore, at least a portion of the microfluidic cassette 12 may be surrounded by a secondary packaging 84 configured to isolate the microfluidic cassette 12 and the reagents stored therein from the external environment (e.g., from gas, moisture, etc.). Any suitable material (e.g., barrier material) may be used to form the secondary packaging 84, such as a biaxially-oriented polyethylene teraphthalate (BOPET) wrapping, a foil wrapping, or the like.

Figure 6:
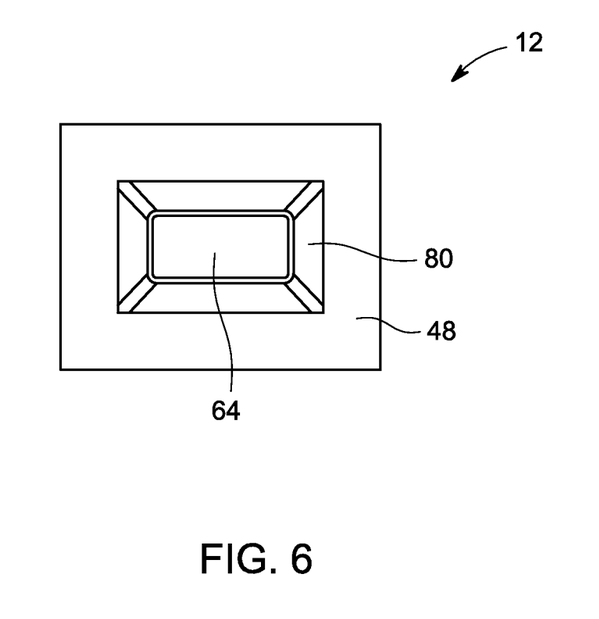
FIG. 6 is a top view schematic of a reagent storage compartment having isolation elements, in accordance with an embodiment.

FIG. 6 is a top view of one or more isolation arms 80 partially surrounding the reagent storage compartment 64. The one or more isolation features 80 may be elongated gaps (e.g., air gaps) in the layers 48 or substrate material that increase the effective distance and/or reduce the surface contact area between the reagent storage compartment 64 and the substrate material. Thus, the isolation features 80 may provide a barrier to isolate the reagents or solvents and/or to prevent undesirable diffusion of the reagent and or solvent.

Figure 7:
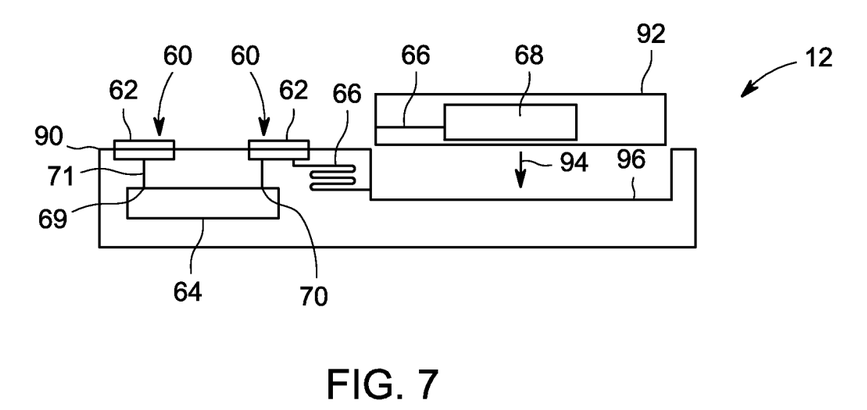
FIG. 7 is a cross-sectional side view schematic of a microfluidic cassette having a first portion including a reagent storage compartment and a second portion including a reaction chamber, wherein the first portion and the second portion are removably coupled together.

As set forth above, the microfluidic cassette 12 may include (e.g., consist of or consist essentially of) a one-piece, unitary, single structure having all reaction chambers 68, vessels, channels, and so forth, suitable to form and isolate the radiopharmaceutical 18. However, in some circumstances, it may be desirable to provide a modular microfluidic cassette 12 such that various portions or vessels of the microfluidic cassette 12 can be easily removed to facilitate reuse, replacement, repair, and increased flexibility and customization of the microfluidic cassette 12, for example. In such embodiments, the microfluidic cassette 12 may be a single unit that is an assembly of multiple (e.g., two or more) one-piece structures, each one-piece structure having a separate portion of the features used to generate the radiopharmaceutical 18. Accordingly, FIG. 7 is a side view schematic of one embodiment of the microfluidic cassette 12, wherein the reagent storage compartment 64 and the reaction chamber 66 are removably coupled together. Specifically, in the depicted example, a first portion 90 (e.g., a first layer, a reagent storage portion, or a first one-piece structure) may include the reagent storage compartment 64, while a second portion 92 (e.g., a second layer or reaction portion) may include the reaction chamber 66. The first portion 90 and the second portion 92 may be fabricated separately and may have a shape and/or geometry that enables the portions 90, 92 to be coupled together (e.g., to form the microfluidic cassette 12 as an assembled single unit). For example, the second portion 92 may be inserted as shown by arrow 94 into a cavity 96 formed within the first portion 90. It should be understood that other configurations may be utilized to form the microfluidic cassette 12. For example, the first portion 90 may be inserted into a cavity formed within the second portion 92.

The portions 90, 92 may be coupled via any suitable technique, such as adhesives, bonding, or mechanical fit (e.g., corresponding mechanical or geometric features so as to form a friction fit, interference fit, snap fit, or the like). In some embodiments, the first portion 90 and the second portion 92 may be coupled together after the reagents are stored within the reagent storage compartment 64, and thus, it may be desirable to couple the portions 90, 92 together via any suitable bonding technique having a temperature that does not affect the stored reagents, such as laser bonding or ultrasonic bonding techniques. When coupled together, the flow paths 66 of each portion 90, 92 may align to extend between the reagent storage compartment 64 and the reaction chamber 68 to enable the generation of the radiopharmaceutical 18 as described herein. Additionally, in some embodiments the second portion 92 may be removable, such that either one or both of the first portion 90 or the second portion 92 may be easily cleaned and/or reused, for example. In such embodiments, a mechanical coupling method may be desirable to facilitate disassembly and reassembly, and to avoid the use of other costly equipment or other materials that could be potential source of contamination. In some embodiments, separating the second portion 92 from the first portion 90 after the radiopharmaceutical 18 is generated may facilitate transfer of the generated radiopharmaceutical 18 to another device, such as a syringe 16 for administration to the patient. The first portion 90 and the second portion 92 may comprise any of the materials described above, and each of the portions 90, 92 may comprise the same, or different, materials. Additionally, both portions may be disposable or reusable, or in some embodiments, one portion may be disposable while another may be reusable.

Figure 8:
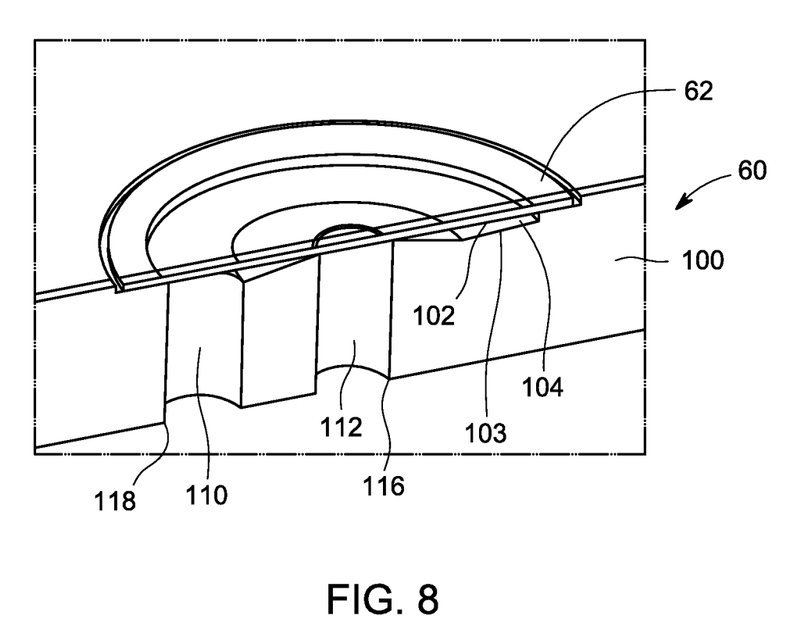
FIG. 8 is a cross-sectional top perspective view of a valve configured to control a flow of a reagent, in accordance with an embodiment.

FIG. 8 is one embodiment of the valve 60 configured to control the movement of the reagent from the reagent storage compartment 64, though the valve 60 is intended to be an example of any one or a combination of valves employed in the microfluidic cassette 12. As shown, the valve 60 may include a valve body 100 and the membrane 62. The valve 60 may also include a floating gasket 102, positioned between the valve body 100 and the membrane 62 (e.g., prior to applying the membrane 62 over the valve body 100). The valve body 100 and membrane 62 may be formed from any suitable polymer material, such as the microfluidic cassette 12 substrate material, while the floating gasket 102 may be made from a soft material, such as a fluoropolymer (e.g., polytetrafluoroethylene or PTFE). The valve body 100 includes at least one stepped edge 103 such that when the valve 60 is assembled, the valve body 100 and the membrane 62 define a valve recess 104, in which the floating gasket 102 is positioned. Additionally, the valve body 100 includes at least two annular recesses defining a first fluid port 110 and a second fluid port 112, and both ports 110, 112 are in fluid communication with valve recess 104. The first fluid port 110 and the second fluid port 112 include an inlet aperture 116 and an outlet aperture 118, respectfully, which enable the flow of reagent into and out of the valve 60 (and therefore the reagent storage chamber 64, or channel, to which it is fluidly coupled). Each valve 60 may thus be connected to two isolated channels or conduits (e.g., flow paths 64) at apertures 116, 118 to facilitate the movement of the reagent through the valve 60. The valve 60 of the presently disclosed embodiments may include any of the features of the microvalve disclosed in U.S. Patent Application Publication No. 2012/0267561, which is incorporated herein by reference in its entirety for all purposes.

In some embodiments, the valve 60 may be sealed by positioning the membrane 62 adjacent to the valve body 100. For example, the membrane 62 may deform, adhere, or otherwise be couple to the valve body 100 to seal the valve 60. In some embodiments, a force and/or heat applied during manufacturing or fabrication of the valve 60 may cause the membrane 62 to deform, adhere, or otherwise be couple to the valve body 100. Accordingly, in some embodiments, the microfluidic cassette 12 may include features to facilitate opening the valve 60. For example, the microfluidic cassette 12 and/or the interface system 14 may be configured to apply pressure (e.g., force) inside the reagent storage chamber 64 or other internal component of the microfluidic cassette 12 to separate the membrane 62 from the valve body 100 or by applying pressure (e.g., negative pressure or pulling force) external to the microfluidic cassette 12 to separate the membrane 62 from the valve body 100.

Figure 9:
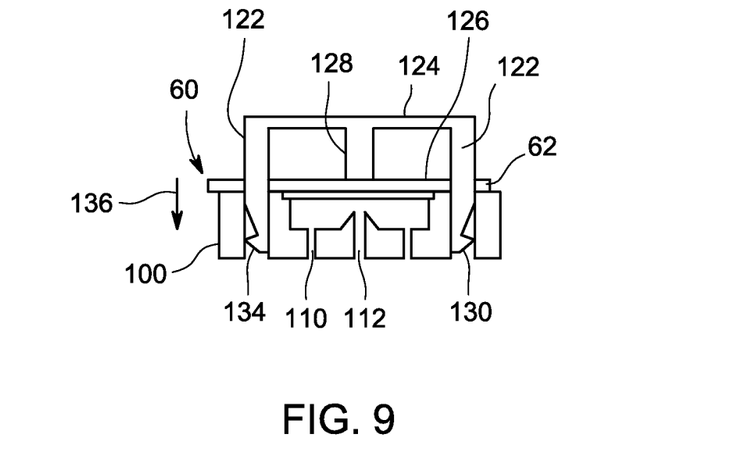
FIG. 9 is side view schematic of a sealing mechanism in an open configuration, in accordance with an embodiment.
Figure 10:
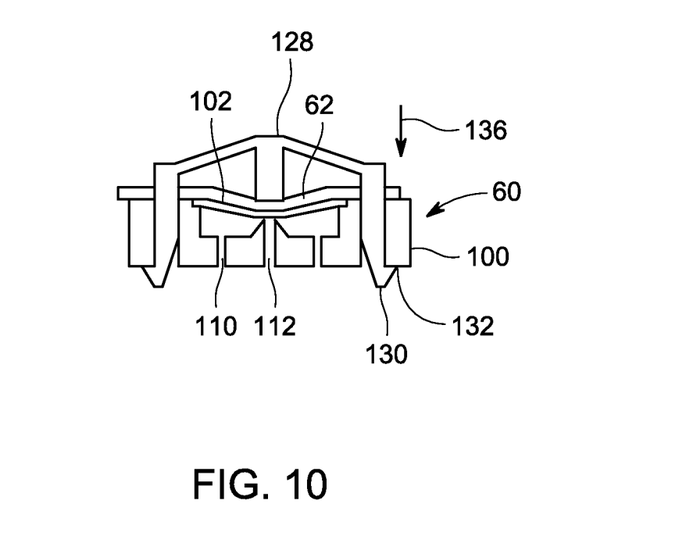
FIG. 10 is a side view schematic of a sealing mechanism in a closed configuration, in accordance with an embodiment.

In certain embodiments, it may be desirable to provide a sealing mechanism 120 to control and/or to seal the valve 60. FIG. 9 is one embodiment of the sealing mechanism 120 in an open position, and FIG. 10 is one embodiment of the sealing mechanism 120 in a closed position. Sealing the valves 60 of the microfluidic cassette 12 may reduce or prevent leakage of the reagents or solvents out of the reagent storage compartments 64 (e.g., so as to inadvertently cause the reaction) and/or may reduce or prevent contamination of the reagents or solvents. As shown, the sealing mechanism 120 may include one or more extensions 122 (e.g., arms) extending from a support structure 124. The support structure 124 may be configured to be generally parallel to the top surface 126 of the membrane 62 of the valve 60 when applied over the valve 60. The one or more extensions 122 may extend from the support structure 124 to engage the valve 60 and/or to engage the layers 48 of the microfluidic cassette 12. In some embodiments, the one or more extensions 122 extend generally orthogonally from the support structure 124. The sealing mechanism 120 may also include a clamp 128 extending from the support structure 124, the clamp 128 being positioned to cover the second fluid port 112 when the sealing mechanism 120 is moved to a closed position, as described in more detail below.

The sealing mechanism 120 may have a shape and/or a geometry that enables the sealing mechanism 120 to mechanically lock or snap into place about the valve 60. For example, the one or more extensions 122 may include protrusions 130 or other surface features configured to engage a bottom surface 132 of the valve 60 or to otherwise engage a portion of the valve 60. In some embodiments, the one or more extensions 122 may pass through and/or engage one or more layers 48 of the microfluidic chip 12 and/or may pass through all of the layers of the microfluidic chip 28, engaging the bottom surface 54. In the open position of FIG. 9, the one or more extensions are positioned within openings 34, which may be formed in the valve body 100 or in the layer 48 surrounding the valve body 100, for example. As the sealing mechanism 120 moves into the closed position as indicated by arrow 136, the one or more extensions 122 move within the openings 34 and expand (e.g., via a spring, such as a living spring mechanism) to engage the bottom surface 132 of the valve 60, as shown. The one or more extensions 122 may be biased such that they automatically expand when the protrusions 130 exit the openings 134, as shown in FIG. 10. Additionally, in the closed position, the clamp 128 depresses the membrane 62 and/or the floating gasket 102 to seal the second port 112, thus isolating the second port 112 from the first port 110 and preventing the movement of substances through the valve 60. In some embodiments, the support structure 124 may transition from a planar to an angled structure when the sealing mechanism is in the closed position, as shown in FIG. 9.

In some embodiments, the sealing mechanism 120 may be utilized to seal the valve 60, thus controlling the movement of reagents from the reagent storage compartment 64 to the reaction chamber 68. In certain embodiments, once the sealing mechanism 120 is applied and secured over the valve 60 (e.g., in the closed position), the valve 60 may only be opened by breaking, destroying, or otherwise removing (e.g., irreplaceably removing) the sealing mechanism 120. For example, the valve 60 may be opened by breaking the support structure 124 of the sealing mechanism 120, thus enabling the clamp 128 to be removed from the second port 112. In other embodiments, the valve 60 may be opened by breaking the protrusions 130 and/or the one or more extensions 122, thus enabling the support structure 124 and/or the clamp 128 to be removed. Accordingly, in operation, the interface system 14 may be configured to initiate and/or to control the movement of the reagent out of the reagent storage compartment 64 by moving, breaking, or destroying the sealing mechanism 120. As discussed above, the reagent may be transferred from the reagent storage compartment 64 to any other suitable component of the microfluidic cassette 12, such as the reaction chamber 68, for example. Therefore, the sealing mechanism 120 not only securely seals the valve 60, but may also enable the interface system 14 to initiate the transfer of the reagent out of the reagent storage compartment 64 and/or to initiate the reaction process using only actuators and protocols to break the sealing mechanism 120.

Figure 11:
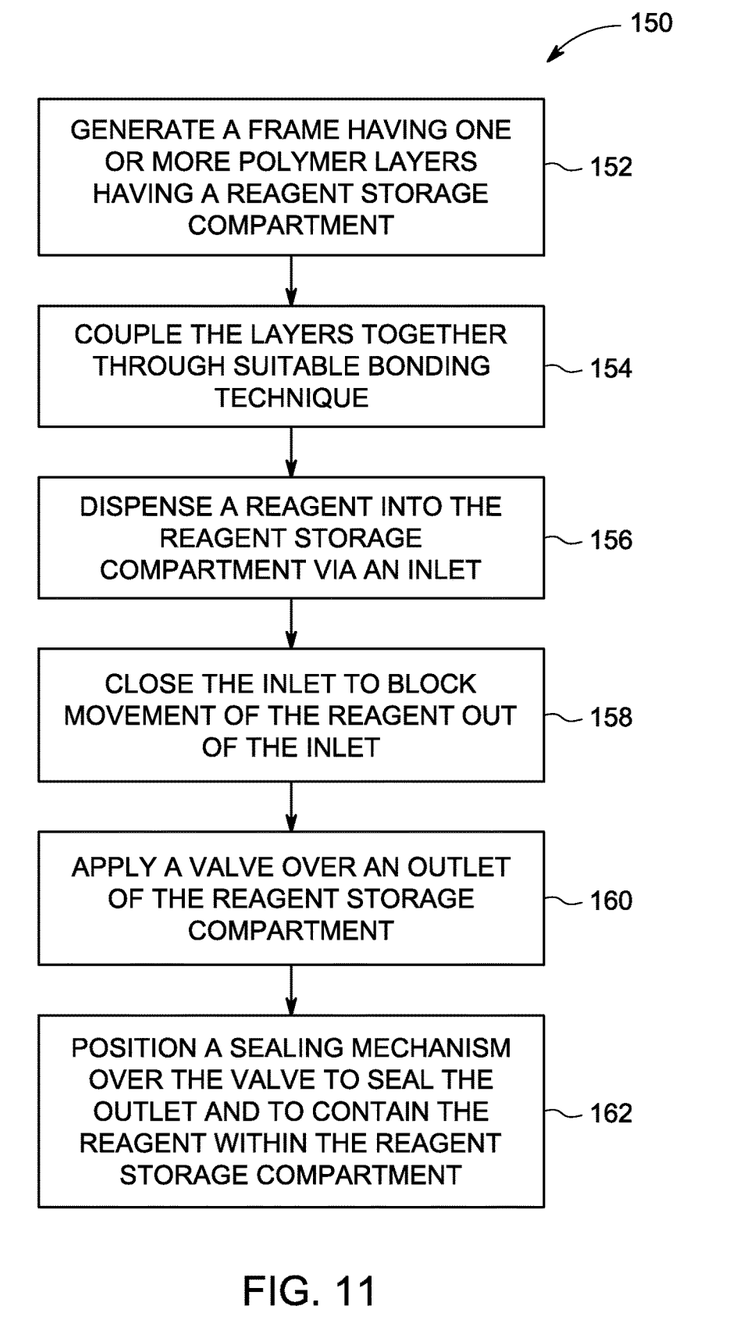
FIG. 11 is a flow diagram of a method of manufacturing a microfluidic cassette having a reagent stored in a reagent storage compartment, in accordance with an embodiment.

The microfluidic cassettes 12 described herein may include various vessels formed within multiple layers 48 (e.g., a layered substrate), and such microfluidic cassettes 12 may be formed through any suitable manufacturing process. FIG. 11 is a flow chart of a method 150 for manufacturing the microfluidic cassette 12, in accordance with one embodiment. The method 150 includes various steps represented by blocks. As noted above, any of the methods or steps of the methods provided herein may be performed as an automated procedure by a system. Further, certain steps of the method 150 may be implemented by a process-based machine including a memory storing instructions for facilitating all or part of a particular step of the method 150. Additionally, although the flow chart illustrates the steps in a certain sequence, it should be understood that the steps may be performed in any suitable order and certain steps may be carried out simultaneously, where appropriate. Further, certain steps or portions of the method may be performed by separate devices and/or separate means. Additionally, although the method 150 is described with respect to one microfluidic cassette 12, it should be understood that more than one microfluidic chip 12 (e.g., 2, 3, 4, 5, 6, 7, 8, 9, 10, or more) may be manufactured or generated simultaneously or approximately simultaneously (e.g., during overlapping time periods) by the method 150.

As shown, the method 150 begins at step 152 by generating a base (e.g., a substrate or a frame) having one or more layers 48, including polymer layers 48. The layers 48 may be individually fabricated via injection molding techniques, machining techniques, etching techniques, or any other suitable techniques, and various vessels or chambers (e.g., the reagent storage compartment 64) may be formed within or on the layers 48. The layers 48 may be fabricated in parallel, thus reducing manufacturing time and/or costs.

At step 154, the one or more layers 48 may be bonded together via any suitable process, such as thermocompression fusion bonding, solvent assisted bonding, or other technique. In embodiments where the reagent storage compartment 64 comprises the coating 78 (FIG. 5), additional sealing or bonding techniques may be carried out. For example, a labyrinth seal or a pinch seal may be created at a junction between adjacent layers 48 by compressing small protrusions from surfaces of each layer 48 created during the molding process.

At step 156, a reagent is dispensed into the reagent storage compartment 64 via an inlet (e.g., inlet septum). In certain embodiments, multiple reagents and/or solvents may be dispensed into multiple reagent storage compartments 64, each having a respective inlet. The particular reagents and/or solvents dispensed into the various reagent storage compartments 64 may be used to generate a PET or a SPECT tracer, in some embodiments.

After the reagent and/or solvent is inserted into the reagent storage compartment 64, the inlet is closed and/or sealed to block movement of the reagent out of the inlet of the reagent storage compartment 64 via any suitable technique, at step 158. At step 160, the valve 60 may be applied over an outlet of the reagent storage compartment 64. The valve 60 may be seated over the valve body 100 as shown in FIG. 8, for example. At step 162, the sealing mechanism 120 is positioned over the valve 60 to seal the outlet and to contain the reagent within the reagent storage compartment 64. For example, the sealing mechanism 120 may be snapped or mechanically fitted into place, as shown in FIG. 10, for example. Once the sealing mechanism 120 is in place, the microfluidic cassette 12 may be stored for long periods of time (e.g., days, months, one year, two years, or longer) prior to use without decay or contamination of the stored reagents. After manufacture, the microfluidic cassette 12 may be provided to a medical facility where it can be used in conjunction with the interface system 14, or other suitable device, to generate a product using the stored reagents, as set forth in method 30 of FIG. 2.

Figure 12:
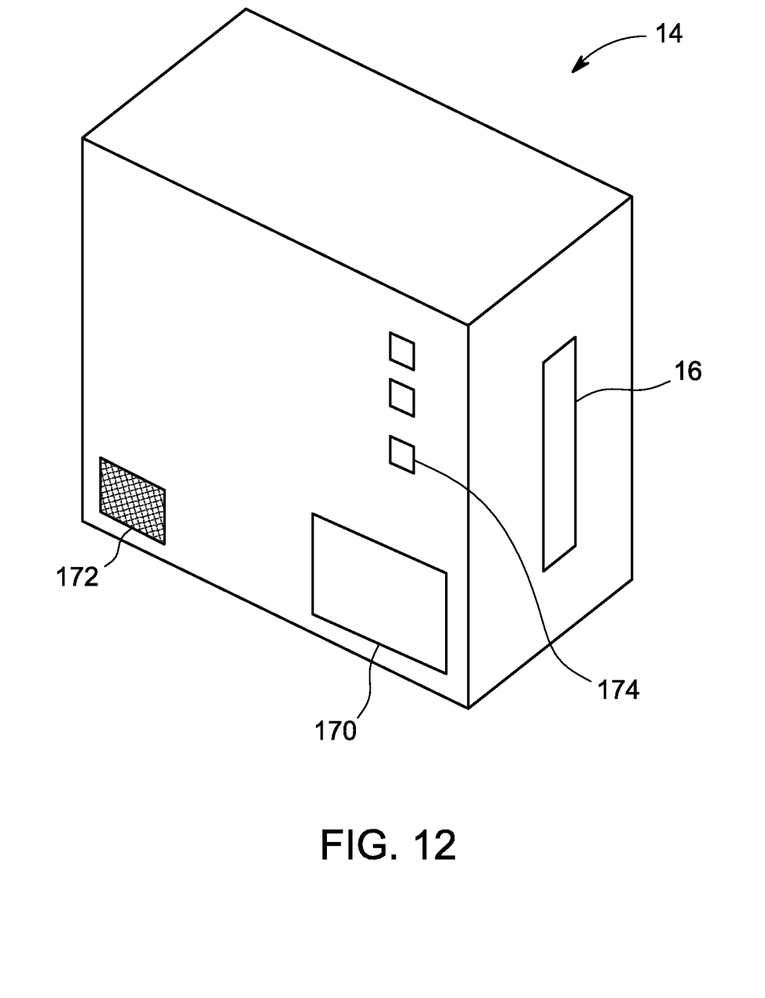
FIG. 12 is a perspective view schematic of an interface system configured to receive a microfluidic cassette and to facilitate generation of a radiopharmaceutical, in accordance with an embodiment.

With the foregoing in mind, FIG. 12 is one embodiment of the interface system 14 that may be configured to receive the microfluidic cassette 12 and to control the reaction process. As noted above, the interface system 14 may be configured to initiate and/or to control synthesis of the radiopharmaceutical 18 manually or automatically and may be any suitable processor-based machine including a memory storing instructions executable by one or more processors for facilitating the synthesis of the radiopharmaceutical 18. Additionally, the interface system 14 may be configured to perform steps without user intervention or may be configured to receive a user input and execute instructions in response. The instructions may include providing an input to hardware components of the system 10, which may function to mechanically or otherwise physically interact with one or more components of the interface system 14. For example, the instructions may include providing an input to a valve control component (e.g., actuator) of the interface system 14, which may function to mechanically alter (e.g., break or destroy) the sealing mechanism 120 on the microfluidic cassette 12 to initiate the reaction process, as discussed above. Accordingly, in certain embodiments, the interface system 14 may be configured to operate the valve control component according to programmed settings, thus opening the valves 60 and/or altering the sealing mechanisms 120 (FIG. 9) at predetermined times and in a predetermined sequence.

In some embodiments, the interface system 14 may include components (e.g., cassette handling components) configured to select and/or to retrieve the microfluidic cassette 12 (e.g., from a magazine or other storage device) as set forth above with respect to FIG. 2. Additionally, as noted above, the interface system 14 may include a heat source, a cooling source, a mechanical agitation (e.g., vibration) source, or the like. In some embodiments, the interface system 14 may include appropriate types of sensors configured to enable the processors to monitor the reaction (e.g., temperature, pH, or other properties in the reaction chamber), for example to may adaptively adjust reaction conditions (e.g., temperature, pressure, agitation, etc.). Through such techniques, the system 10 may synthesize a product via the reaction, such as the radiopharmaceutical 18 suitable for PET imaging, as provided in step 40.

In some embodiments, the interface system 14 may also include various features for receiving input from the user and/or for conveying information to the user. For example, the interface system 14 may include a display 170 or a speaker 172 configured to provide visual or audible information, such as alarms or notifications that signal an error, an end (e.g., completion) of the reaction process, time remaining in the reaction process, reaction conditions, instructions for use, or the type of microfluidic cassette 12 or product that is being synthesized, for example. In some embodiments, the interface system 14 may include one or more user inputs 174 that may enable the user to scroll through various display options, to trigger the interface system 14 to begin the reaction process, or to enable the user to input the product desired or to provide other instructions for operation, for example. Additionally, the interface system 14 may include components configured to facilitate or to direct transfer of the microfluidic cassette 12 to a waste container for disposal or for separating any reusable portions from disposable portions and transferring the portions to appropriate waste or recycling containers. In some embodiments, the interface system 14 may be configured to facilitate transfer of the radiopharmaceutical to a device, such as the syringe 20, for administration to the patient 22.

As noted above, although the microfluidic cassette 12 and the techniques for manufacturing and/or utilizing the microfluidic cassette 12 are discussed in the context of PET and SPECT imaging systems, it should be understood that the microfluidic cassette 12 and the disclosed techniques may be adapted for use with any suitable type of system that utilizes a small scale fluid processor and stored reagents. For example, the disclosed mircofluidic cassette 12 and techniques may be adapted for storing any suitable fluid or reageant and for use in cell processing, chemical processing, and/or biomolecule processing systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A microfluidic device for storing a reagent, comprising:
 a single unit, comprising:
  a first portion of the microfluidic device comprising a reagent storage compartment configured to hold a reagent;
  a second portion of the microfludic device comprising a reaction chamber configured to receive the reagent and to support the reagent during a reaction process to form a product; and
  a valve comprising a membrane, wherein the valve is located downstream of the reagent storage compartment and upstream of the reaction chamber relative to a flow path extending between the reagent storage and the reaction chamber, and the valve is configured to isolate the reagent storage compartment from the reaction chamber when the valve is in a closed state; and
  a sealing mechanism positioned over the valve, wherein the sealing mechanism comprises a support structure and a clamp extending from the support structure that is configured to contact the membrane and to depress the membrane to cause the valve to reach the closed state, wherein the sealing mechanism comprises arms extending from the support structure that flank the clamp, and the sealing mechanism is positioned over the valve such that the support structure is proximate to a first surface of the device, and the arms extending from the support structure are configured to extend into the device and via protrusions on ends of the arms to engage a second surface of the device at a location underneath the valve to hold the valve in the closed state.

2. The microfluidic device of claim 1, wherein the microfluidic device is configured to store and to isolate all reagents utilized in the reaction process to form the product from a surrounding environment for a period of time prior to initiation of the reaction process.

3. The microfluidic device of claim 1, wherein the sealing mechanism is configured to enable the valve to be in an open state only when at least a portion of the sealing mechanism is broken.

4. The microfluidic device of claim 1, wherein the first portion and the second portion are coupled together to form the single unit.

5. The microfluidic device of claim 1, wherein the first portion includes a cavity configured to removably receive the second portion.

6. The microfluidic device of claim 1, comprising a coating disposed within the reagent storage compartment configured to reduce diffusion of the reagent from the reagent storage compartment.

7. The microfluidic device of claim 1, wherein the first portion comprises at least two reagent storage compartments each storing different reagents.

8. The microfluidic device of claim 1, comprising the reagent within the reagent storage compartment, wherein the reagent is configured to generate a PET or a SPECT tracer.

9. A system for storing a reagent, comprising:
a microfluidic device comprising:
one or more layers forming a substrate;
a reagent storage compartment configured to store a reagent and disposed within the substrate;
a reaction chamber fluidly coupled to the reagent storage compartment via a flow path extending between the reagent storage compartment and the reaction chamber, wherein the reaction chamber is configured to hold the reagent during a reaction process;
a valve disposed across the flow path downstream of the reagent storage compartment and upstream of the reaction chamber, wherein the valve comprises a membrane and is configured to isolate the reagent storage compartment from the reaction chamber when the valve is in a closed state;
a sealing mechanism configured to be positioned over the valve, wherein the sealing mechanism comprises a support structure and a clamp extending from the support structure that is configured to contact the membrane and to depress the membrane to cause the valve to reach the closed state, wherein the sealing mechanism comprises arms extending from the support structure that flank the clamp, and the sealing mechanism is positioned over the valve such that the support structure is proximate to a first surface of the device, and the arms extending from the support structure are configured to extend into the device and via protrusions on ends of the arms to engage a second surface of the device at a location underneath the valve to hold the valve in the closed state; and
an interface system configured to manipulate the sealing mechanism to initiate the movement of the reagent from the reagent storage compartment toward the reaction chamber.

10. The system of claim 9, wherein the interface system is configured to break at least a portion of the sealing mechanism to adjust the valve to an open state to initiate the movement of the reagent from the reagent storage compartment toward the reaction chamber.

11. The system of claim 9, wherein the device comprises the reagent, wherein the system is configured to synthesize a PET tracer or a SPECT tracer using the reagent.

12. The system of claim 9, wherein the device comprises a first portion having the reaction storage compartment and a second portion having the reaction chamber, wherein the first portion is removably coupled to the second portion.

13. A method of manufacturing a microfluidic device for storing a reagent, comprising:
generating a substrate having one or more layers;
creating a reagent storage compartment within the substrate, the reagent storage compartment having an inlet and a flow path configured to transport a reagent from the reagent storage compartment;
coupling one or more additional layers having a reaction chamber formed therein to the flow path;
inserting a reagent into the reagent storage compartment via the inlet;
applying a valve having a valve body and a membrane along the flow path downstream of the reagent storage compartment and upstream of the reaction chamber; and
positioning a sealing mechanism comprising a clamp over the membrane;
moving the sealing mechanism relative to the valve to cause the clamp to contact and to depress the membrane to seal the flow path and to contain the reagent within the reagent storage compartment, and
mechanically locking the sealing mechanism about the valve by driving arms of the sealing mechanism that flank the clamp through the valve body from a first side of the valve body to a second side of the valve body to enable protrusions on ends of the arms to engage a surface on the second side of the valve body located underneath the valve body.

14. The method of claim 13, comprising bonding the one or more additional layers to the one or more layers.

15. The method of claim 13, comprising applying a coating to at least a portion of an interior of the reagent storage compartment, the coating being configured to reduce diffusion of the reagent out of the reagent storage component.

16. The method of claim 13, wherein the stored reagent is configured to be used to synthesize a PET tracer.

* * * * *